United States Patent

Grenier

[15] 3,698,684
[45] Oct. 17, 1972

[54] STEM SEALING FOR VALVING
[72] Inventor: Wilfred J. Grenier, Rutland, Mass.
[73] Assignee: General Industries, Inc., Worcester, Mass.
[22] Filed: Sept. 17, 1970
[21] Appl. No.: 73,095

[52] U.S. Cl. ............251/214, 251/308, 251/317
[51] Int. Cl. ..............................................F16k 41/04
[58] Field of Search......251/184, 214, 309, 315, 308, 251/317; 277/33, 61, 212, 212 F

[56] References Cited

UNITED STATES PATENTS

| | | | |
|---|---|---|---|
| 3,425,663 | 2/1969 | Priese | 251/214 X |
| 3,192,942 | 7/1965 | Manor et al. | 251/214 X |
| 1,791,914 | 2/1931 | Tomlinson | 251/184 |
| 2,146,910 | 2/1939 | Nordstrom | 251/184 X |
| 3,231,235 | 1/1966 | Anderson et al. | 251/214 |
| 3,051,190 | 8/1962 | Milleville | 251/214 X |
| 2,721,749 | 10/1955 | Crow | 277/212 F |
| 3,537,682 | 11/1970 | Priese | 251/214 |
| 292,185 | 1/1884 | Thorpe | 277/33 |
| 3,239,191 | 3/1966 | Widera | 251/214 X |

Primary Examiner—Henry T. Klinksiek
Assistant Examiner—David R. Matthews
Attorney—Charles R. Fay

[57] ABSTRACT

A stem seal for a valve which comprises a face seal closely held between a shoulder on the stem and the interior of the valve housing by means of a wave washer under the handle; there being a bearing for the stem, the bearing tightly engaging the exterior of the valve housing and lying under the wave washer, together with a resilient grounding clip exerting outward pressure on the stem and the face seal, and means for preventing extrusion of the face seal.

10 Claims, 4 Drawing Figures

PATENTED OCT 17 1972 3,698,684

Inventor
Wilfred J. Grenier
By Charles P. Fay,
Attorney

3,698,684

STEM SEALING FOR VALVING

BACKGROUND OF THE INVENTION

Most conventional valves including ball valves use a stuffing box, gland, packing, and gland nut which are apt to leak under certain conditions of use and which are relatively short lived under any conditions. Also, these packings are apt to result in valve stem operating failure including breaking or twisting off of the stem due to the seizing action of particles which eventually get in between the bearing and the stem of the valve. Also such convention stuffing boxes, etc., permit the flow media to contact the outside air under certain conditions and thus allow a chemical reaction with the air corroding or seizing the stem. Prior art stuffing boxes, packing, etc., allow excessive wear due to the entrance of foreign particles or abrasive flow media entering between the stem and the packing. It is the general object of the present invention to obviate all of these difficulties by a very simple, easily assembled seal.

SUMMARY OF THE INVENTION

In the present case the valve stem is provided at its inner end with a resilient electric grounding clip urging the stem outwardly against a face seal of any suitable material including Teflon, the seal in turn bearing on the interior surface of the body of the housing, the exterior surface of which is provided with a new and improved bearing (which may be conductive to aid in the grounding operation of the valve) the bearing being held down under the handle by means of a wave washer which when seated by the handle upon the bearing forms a completely tight seal as respects the face seal, preventing any influx of particles or any exit of the flow media in the valve. This also provides automatic compensation for wear of the face seal, which is provided with a retaining washer preventing it from cold flowing or extrusion under pressure so that the entire stem seal is extremely long lasting and stands up under even excessive use and excessive pressures.

PREFERRED EMBODIMENT OF THE INVENTION

Figure 1:
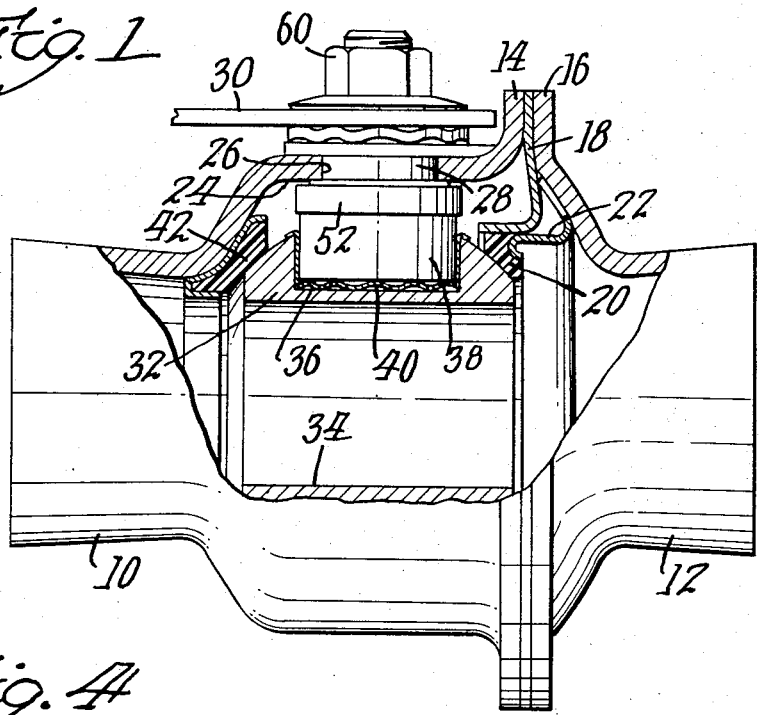
FIG. 1 is a view in elevation illustrating the invention, parts being broken away and in section.

As illustrated the valve housing in the present case comprises two main parts 10 and 12 which are bolted or welded together as at the periphery thereof, indicated at 14 and 16, holding therebetween an annular support member 18 for a valve seat seal 20 also held in position by an annular ring 22 as described in my copending application Ser. No. 67,360 filed Aug. 27, 1970.

On the housing part 10 the annular portion at 14 is the terminus of a flat area of the housing generally indicated at 24 in which there is an opening 26 for the stem 28 of the valve, this stem being turned as by a handle 30 to in turn turn the ball 32 or other valve member. The ball 32 has a flow opening 34 and a recess 36 to receive the rectangular terminal portion 38 of the stem for turning the ball in the usual manner but in the present case the recess 36 also contains a bent spring clip which may be e.g., in the form of a wave and indicated at 40. This clip continuously tends to push the valve stem upwardly and outwardly against the bottom of the recess 36 as a reaction point. This also provides an electrical grounding clip. It will be understood that as the handle 30 is turned, the ball 32 is turned also being held by the seat seal 20 as for instance at the upstream side thereof and another seat seal 42 at the downstream side thereof.

Figure 2:
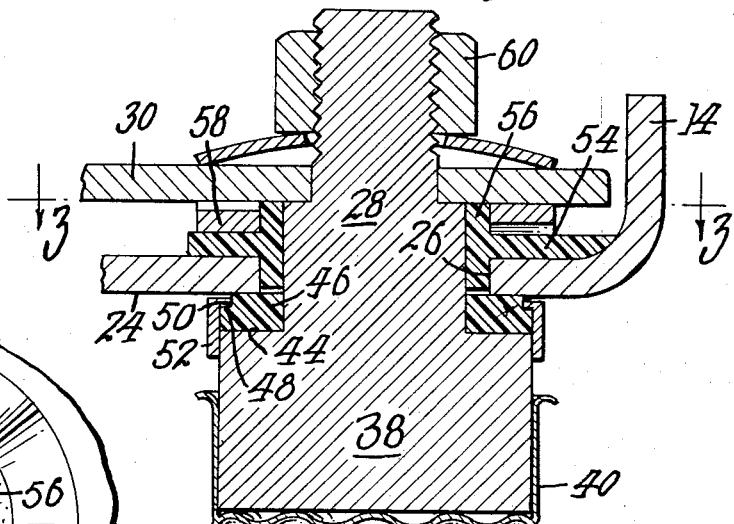
FIG. 2 is a sectional view on an enlarged scale illustrating the invention.

The rectangular member 38 on the stem 28 is provided with an annular shoulder 44, see particularly FIG. 2. On this annular shoulder 44 there is a face seal 46, also of annular shape, and made out of suitable sealing material of elastometric or semielastometric nature having good anti-friction qualities, e.g., Teflon. It is provided with an exterior annular shoulder 48 receiving the inturned flange 50 of a cylindrical washer 52, this washer holding the face seal against any cold flow under pressure between the shoulder 44 of the stem and the inner surface of a portion of the housing at 24, against which it abuts, as shown. The top edge portion of the washer 52 is provided in a dimension that it does not bear on the interior surface of the portion 24 of the housing, which does bear on the upper surface of the face seal. The ground clip 40 assists to continuously urge the stem and its shoulder 44 against the interior surface of the housing at 24, surrounding the opening 26 of the stem 28.

Between opening 26 and stem 28 there is provided an annular bearing preferably of an electricity conducting anti-friction material. This bearing is indicated at 54 and is generally flat, see FIG. 2, but at its interior, in contact with stem 28, it is provided with a cylindrical sleeve 56 forming a relatively broad annular bearing annularly for stem 28, the flat portion of the bearing bearing against the exterior surface of the portion 24 of the housing part 10.

Figure 4:
FIG. 4 illustrates the wave washer.
Figure 3:
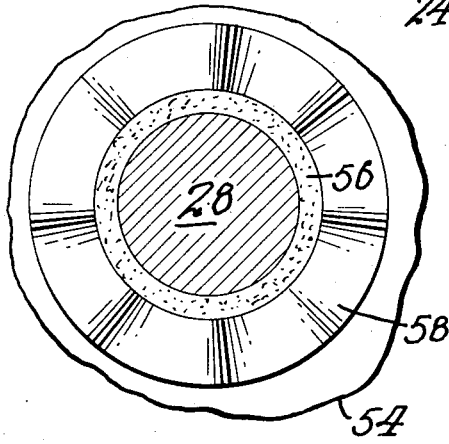
FIG. 3 is a section on line 3—3 of FIG. 2.

The reference numeral 58 indicates a wave washer shown in detail in FIGS. 3 and 4. This wave washer is of conventional design and it surrounds one portion of the sleeve 56 of the bearing 54. When unstressed it will of course have its upper surface at least partly above this sleeve, but when stressed by pressure on handle 30, it flattens out while continuing to exert pressure between the handle and the flat portion of the bearing 54, transmitting this pressure to the exterior surface of the housing, and drawing the entire stem upwardly and outwardly, so that considerable pressure is exerted on the face seal 46 between the shoulder 44 of stem 28 and the interior surface of the portion 24 of the housing part 10.

The handle 30 is held on the stem 28 by any desired or convenient means. The stem may be threaded and a Keps nut 60 applied thereto thus applying pressure to the handle keeping it flat against the wave washer 58 and the bearing 54, so that the face seal 46 is thereby tightly held between stem shoulder 44 and the inside surface of portion 24 of housing part 10, about the opening 26 therein. It will be noted that there is a gap between the seal 46 and the adjacent portion 56 of bearing 54 as well as a gap between the washer 52 and the housing portion 24, all for the purpose of insuring a long wear under active conditions of use of the apparatus described.

Because of the present novel construction, no foreign particles which may exist in the flow media can find their way into the stem bearing surfaces and this eliminates a prominent cause of valve stem operating failure due to the seizing action of these particles which get inbetwween the packing material and the stem of the ordinary valve. Furthermore, the construction does not permit the flow media to contact outside air under any conditions thus preventing any chemical reaction that might corrode the stem. In addition, excessive wear is prevented as to the seal 46 due to this inability of the foreign particles or abrasive flow media to enter between the interfaces of the face seal 46 and the valve body portion at 24.

Due to the take-up spring action of the wave washer there is an automatic compensation for wear on the stem seal; and the retaining washer 52 contains the face seal and prevents it from cold flowing outwardly under pressure, so that the valve construction can be used in higher pressure rating applications than can otherwise be the case. It is thus seen that the construction of the present valve provides for many installations not heretofore possible or completely operational with the conventional stuffing box, etc.

In addition, the spring clip 40 acts as a ground for the ball as does also the bearing 54 if made of conductive material, and here again it is seen that the use of this valve is greatly enhanced.

During operation of the valve as by opening and closing of the ball by turning the handle e.g., 90°, the stem face seal 46 will rotate under pressure from the stem maintaining its sealing function; it prevents foreign particles of flow media from either entering or escaping; and the washer or retainer 52 locks itself to the face seal for proper containment of the latter during operation. Also as the stem face seal 46 wears, through long operation, the wear is automatically compensated for by the take-up action of the wave washer 58. This wave washer maintains upward pressure on the stem but this in turn is transmitted to the stem face seal 46. The ground clip 40 maintains additional outward pressure against the base of the stem and helps to compensate for wear.

I claim:

1. A valve comprising
   a housing having an opening,
   a valve element within said housing,
   a stem on said valve element extending through said opening, said stem having a shouldered portion located within said housing of greater diameter than said opening and an adjacent portion located partially within said opening of smaller diameter than said opening,
   a handle for turning said stem,
   an annular face seal secured between said shouldered portion of said stem and an interior surface of said housing, spring means urging said shouldered stem portion toward said interior housing surface, and
   bearing means between said adjacent stem portion and said housing opening.

2. The valve of claim 1 wherein said face seal is secured for movement with said stem.

3. The valve of claim 1 wherein said spring means is located beneath said handle to urge said handle outwardly from said housing.

4. The valve of claim 3 wherein said spring means comprises a wave washer.

5. The valve of claim 1 wherein said bearing means includes an inner sleeve surrounding said stem, and an outwardly protruding flange portion, said spring means being confined between a side of said flange portion and said handle.

6. The valve of claim 5 wherein the inner end of said sleeve is slightly spaced from said face seal.

7. The valve of claim 5 wherein the opposite side of said flange portion is located adjacent said housing wall, to confine said housing wall between said flange portion and said face seal.

8. The valve of claim 1 including a retainer for said face seal extending around the circumference of said face seal to prevent outward flow of said seal.

9. A valve comprising
   a housing, a valve element in said housing, said valve element having a fluid passage therethrough, a stem on said valve element, a recess in said valve element sealed from said fluid passage and constructed to receive a portion of the stem by which said valve element is turned, a handle for turning said stem, and spring means electrically grounding the valve element to said stem and arranged to continually urge said stem out of said recess.

10. The valve of claim 9 including an electrically conductive bearing about said stem.

* * * * *